(12) United States Patent
Hyerle et al.

(10) Patent No.: US 9,398,140 B2
(45) Date of Patent: Jul. 19, 2016

(54) CONTEXT-BASED EVENT PROCESSING

(75) Inventors: Robert H. Hyerle, Grenoble (FR); Stephen John Hinde, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 2643 days.

(21) Appl. No.: 11/489,433

(22) Filed: Jul. 20, 2006

(65) Prior Publication Data

US 2007/0071211 A1    Mar. 29, 2007

(30) Foreign Application Priority Data

Sep. 12, 2005   (EP) ..................................... 05300740

(51) Int. Cl.
*H04M 3/42* (2006.01)
*H04M 1/725* (2006.01)
*H04M 3/54* (2006.01)
*H04Q 3/00* (2006.01)

(52) U.S. Cl.
CPC ...... *H04M 1/72569* (2013.01); *H04M 3/42153* (2013.01); *H04M 3/54* (2013.01); *H04Q 3/005* (2013.01); *H04M 2242/14* (2013.01)

(58) Field of Classification Search
CPC ....................................................... H04M 3/42
USPC ..................................................... 379/207.02
See application file for complete search history.

(56) References Cited

U.S. PATENT DOCUMENTS

| 5,933,778 A | 8/1999 | Buhrmann et al. |
| 2006/0079215 A1* | 4/2006 | Perrella et al. ................. 455/417 |
| 2009/0181654 A1* | 7/2009 | Koch et al. ................. 455/414.1 |

FOREIGN PATENT DOCUMENTS

| EP | 1 217 792 | 6/2002 |
| WO | 2004/110040 | 12/2004 |

* cited by examiner

*Primary Examiner* — Creighton Smith
(74) *Attorney, Agent, or Firm* — Fabian VanCott

(57) ABSTRACT

According to one aspect of the present invention there is provided a method, in a telecommunication system, of processing a communication event associated with a subscriber of a communication network, the method comprising: obtaining context data relating to the subscriber, and in response to receiving the communication event, the telecommunications system processing the communication event in accordance with one or more rules generated by the telecommunications system based on the obtained context.

4 Claims, 2 Drawing Sheets

CONTEXT-BASED EVENT PROCESSING

This application claims priority from European patent application 05300740.7, filed on Sep. 12, 2005. The entire content of the aforementioned application is incorporated herein by reference.

FIELD OF THE INVENTION

The present invention relates generally to event processing, and more specifically to context-based event processing, particularly, although not exclusively, in telecommunications systems.

BACKGROUND OF THE INVENTION

Modern telecommunication systems provide users with facilities to enable a degree of personalisation of both telecommunication services and telecommunication devices.

For instance, many telephone services enable users to set up multiple call routing options to provide a highly customisable and personalised telephone service. For example, a user may instruct a telephone network to forward calls intended for his telephone subscriber number to a different telephone subscriber number. A user may also instruct a telephone network to forward calls made to a telephone subscriber number whilst that number is busy to be forwarded to a voice mail service.

Similarly, a user may customise a device, such as a mobile telephone, so that the device operates in a personalised manner. For example, a user may configure a mobile telephone to use a vibrating ringing alert rather than a ring tone in certain situations.

As the user's activity changes through a day so the user may wish to modify the way in which any personalisation options are configured. For example, when a user is at work, he may wish to instruct his residential telephone network to forward any calls made to his residential telephone subscriber number to his office telephone subscriber number. If the user is sleeping, the user may wish that all calls made to his residential telephone subscriber number are immediately forwarded to the user's voice mail service, or he may wish that his mobile telephone vibrates rather than rings when an incoming call is received.

Users may also use more than one customisable service or device, such as, for example, a residential telephone network and a mobile telephone network, a landline telephone, a mobile telephone and a personal computing device. Each service and device may need personalising in a different way depending on the activity of the user.

However, one drawback with the current situation is that the user of such systems or devices has to ensure that any personalisation is constantly updated to ensure that the personalisation accurately reflects the users current desired personalisation options. For example, if a user is away from his home telephone and wishes all calls made to his home subscriber number to be forwarded to his mobile telephone subscriber the user has to actively instruct the home telephony network to forward all calls in the desired manner. If, when back at home, the user wishes to receive all calls made to his mobile telephone subscriber number to be forwarded to his home telephone subscriber number the user has to instruct both the mobile network or mobile device to forward calls to the home telephone subscriber number, and must also instruct the home telephone network to cancel forwarding calls to the mobile telephone subscriber number.

The current situation is thus somewhat unsatisfactory as users have to ensure that each of their personalisable services or devices are correctly configured at all times if they wish their services and devices to function in the anticipated manner. Furthermore the user has to know how to configure each device or service, with each device and service likely being configurable in different manners and to different extents.

SUMMARY OF THE INVENTION

Accordingly, one aspect of the present invention aims to overcome, or at least alleviate, at least some of the above-mentioned problems.

According to a first aspect of the present invention, there is provided a method, in a telecommunication system, of processing a communication event associated with a subscriber of a communication network. The method comprises receiving the communication event, obtaining context data relating to the subscriber, and processing the communication event in accordance with one or more rules generated based on the obtained context.

Advantageously, a service or device may generate its own rules based on the obtained context, without requiring the user or subscriber to define any specific rules or to effect any manual configuration of a device or service.

Suitably, the method further comprises obtaining the context from a context store.

Suitably, the method further comprises generating the rules in response to obtaining the context.

Suitably, the step of obtaining the context comprises obtaining a context defined by the subscriber.

Suitably, the step of generating the rules generates the rules based on the obtained context and additional information stored in a user profile store.

The method may be performed by a communications service, such as a telecommunication service provided by a communications network.

The method may be performed by a communications device, such as a telephone.

Suitably, the communication event is a call establishment request.

The step of obtaining the context may comprise obtaining the context of the subscriber initiating the communications event.

The step of obtaining the context may comprise obtaining the context of the subscriber receiving the communication event.

According to a second aspect of the present invention, there is provided apparatus for processing a communication event associated with a subscriber of a communication network. The apparatus comprises a receiver for receiving the communication event, a communication module for obtaining context data relating to the subscriber, a rule generator for generating one or more rules based on the obtained context, and processing logic for processing the communication event in accordance with the one or more generated rules.

Suitable, the communication module is adapted to obtain context data from a context store.

Suitably, the rule generator is arranged to generate the rules in response to obtaining the context.

Suitably, the communication module is arranged to obtain a context defined by the subscriber.

Suitably, the rule generator is arranged to generate the rules based on the obtained context and additional information stored in a user profile store.

Suitably, the apparatus is adapted for use where the communication event is a call establishment request.

Suitably, the communication module is adapted to obtain the context of the subscriber initiating the communication event.

Suitably, the communication module is adapted to obtain the context of the subscriber receiving the communication event.

According to a third aspect of the present invention, there is provided a communications service comprising the apparatus as described above.

According to a fourth aspect of the present invention, there is provided a communications device comprising the apparatus as described above.

According to a fifth aspect of the present invention, there is provided a telecommunications system comprising a communication service as described above.

According to a sixth aspect of the present invention, there is provided a telecommunications system comprising a communication device as described above.

BRIEF DESCRIPTION OF THE DRAWINGS

Embodiments of the present invention will now be described, by way of non-limiting example only, in which.

DETAILED DESCRIPTION OF THE PREFERRED EMBODIMENTS

Figure 1:
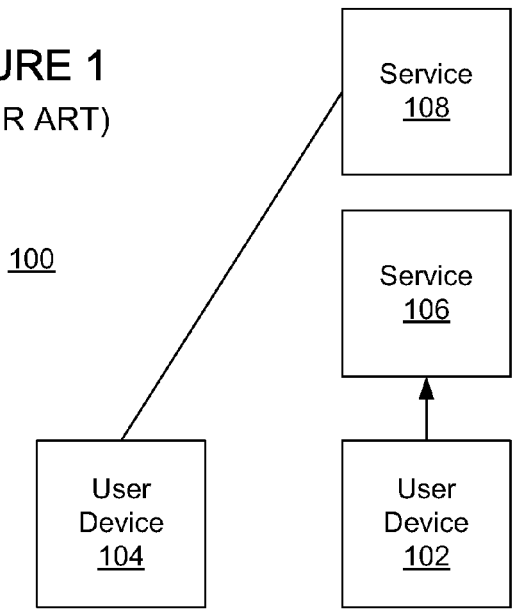
FIG. 1 is a block diagram showing an overview of a system according to the prior art.

Referring now to FIG. 1 there is shown a block diagram of an overview of a system 100 according to the prior art. FIG. 1 shows a user device 104, such as a mobile telephone interacting with a service 108, such as a mobile telephone network, and a user device 102, such as a residential telephone handset interacting with a service 106 such as a residential telephone network.

If the user of the telephone handset 102 wishes to cause all telephone calls made thereto to be automatically forwarded to the mobile telephone handset 104 the user instructs the residential telephone network 106 to forward all calls to the telephone subscriber number associated with mobile telephone handset 104. Typically the instruction will be provided using the telephone handset 102 by, for example, dialling a predetermined code followed by the telephone subscriber number to which calls are to be forwarded, as shown in the example below:

\*94\*0123456789 where \*94\* is a code defined by the network to indicate a call forwarding request;

and where 0123456789 indicates the telephone subscriber number to which all incoming calls are to be forwarded.

In a similar manner, if the user wishes to personalise or customise other features of the service 106, this can be achieved by using the user device 102 in an appropriate manner, as will be understood by those skilled in the art.

In addition to personalising the features of the service 106, the user may also personalise features of the user device 102 to affect the functioning of the device in response to certain events. For example, the user of a mobile telephone can instruct the mobile telephone to use a 'silent' alert instead of a ringing tone when an incoming call is received.

One of the problems with the current situation, however, is that the user has to perform active programming or configuration steps in order to personalise a service or device in response to some parameter or characteristic of the user. A parameter or characteristic of the user may be, for example, the location of the user, the activity of the user, the conscious state of the user, and so on.

Furthermore, as shown in the example above, the configuration step may require the user to know how to personalise each service, and the information (such as a telephone subscriber number to which to forward incoming calls, etc) required for such personalisation. For example, the manner in which a call forward is set up on a residential telephone network is likely to be different to the manner in which a call forward is set up on a mobile telephone network.

Figure 2:
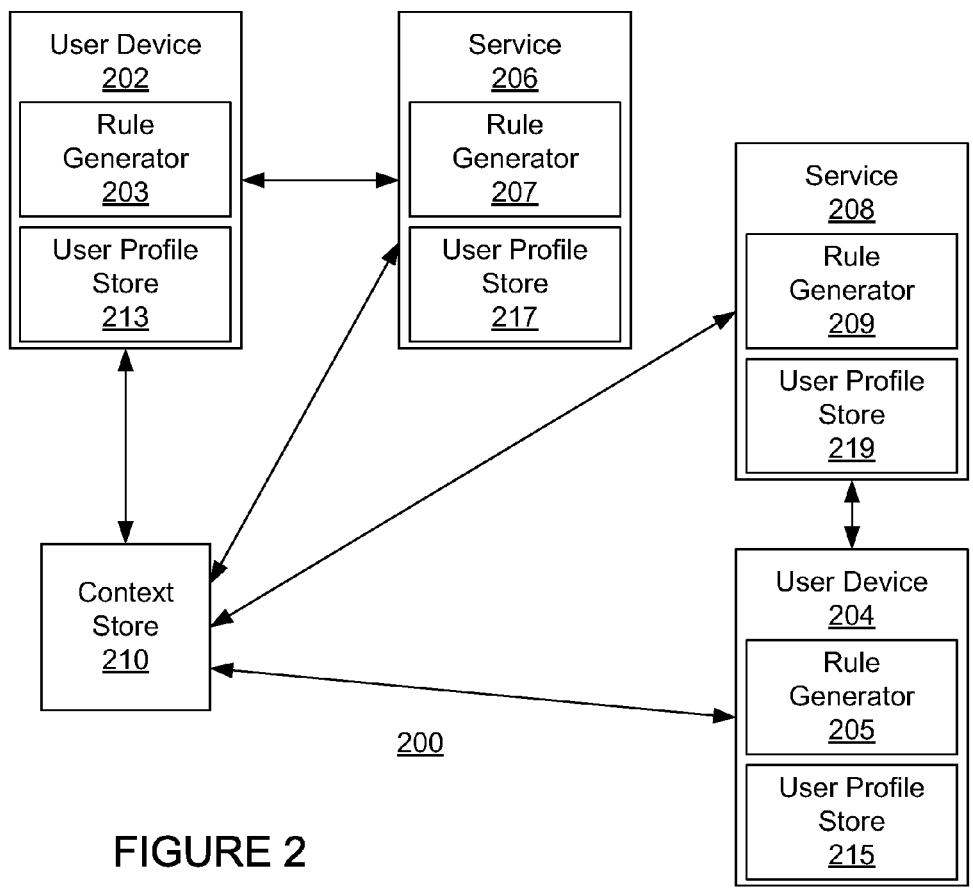
FIG. 2 is a block diagram showing of an overview of a system according to one embodiment of the present invention.

Referring to FIG. 2, there is shown a block diagram of an overview of a system 200 according to one embodiment. FIG. 2 shows a number of user devices 202 and 204, such as a mobile telephone, personal digital assistant, personal computer, or other suitable computing device, and a number of services 206 and 208. Each of the user devices and services has access, via a suitable network, to a context store 210.

In the present example the user device 204 is a mobile telephone handset, the service 208 is a mobile telephone service provided by a suitable mobile telephone network, the user device 202 is a residential telephone handset, and the service 206 is a residential telephone service provided by a suitable residential telephone network.

The user device 202 has access to the user context store 210 to which the user device 202 publishes, or otherwise makes available, information representing the context of the user at a given time.

Figure 3:
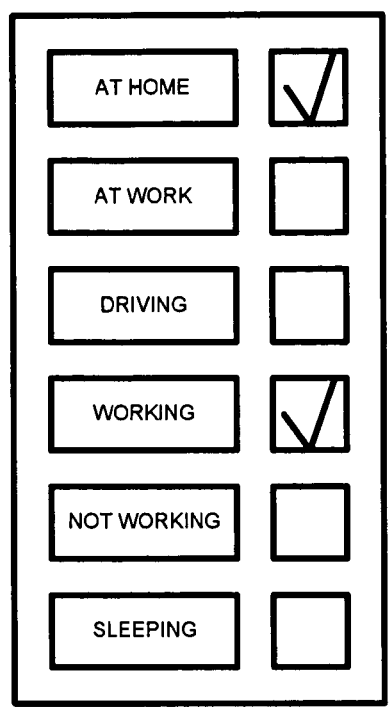
FIG. 3 is a diagram representing part of a graphical user interface for defining a context, according to one embodiment of the present invention.

The context may be determined by the user through use of the user device 202. For example, the user device 202 may present to the user a list, such as shown in FIG. 3, of different parameters which the user can use to describe his current context. Using an appropriate user interface of the user device 202, the user can, for example, tick each of the boxes which correspond to his current context, thereby providing a description of his current context which can be published to the context store 210. For example, some of the items in the list may relate to the current location of the user, others to the current activity of the user, others to the conscious state of the user, and so on.

For example, if the user is working at home, the user may tick the box "Working" and the box "At Home". Similarly, if the user is sleeping at home the user may tick the boxes "At Home" and "Sleeping". Alternative ways of defining a context could also be used such as, for example, a graphical user interface. Such a graphical user interface could be arranged to use graphical icons to represent different characteristics or parameters of the user's context. For example, a 'house' icon could be used to indicate that the user is at home, a 'car' icon could be used to indicate that a user is driving, and so on. In this way a user could use a drag-and-drop technique, for example, to drag-and-drop all relevant graphical icons onto a graphic representation of the user to define the user's context.

In other embodiments the context may also be defined by another user, for example on behalf of a user, automatically by a user device, or in any other appropriate manner.

Some of the context parameters may include additional information such as, for instance, the telephone subscriber number of the user's mobile telephone or business telephone.

Once the context has been defined it may be published by the user device 202 to the context store 210 in an appropriate manner, such as using an appropriate protocol such as HTTP. The publishing may be automatic upon modification or definition of the context, or the user may be prompted to effect the publishing of the context. The published context does not define any actions to be taken according to the context, but simply describes the current context of the user of the user device 102.

Each of the user devices 202 and 204 and services 206 and 208 have access to the context store through an appropriate network, such as the Internet. The user may use any suitable user device, such as user device 202 or 204, for defining the user context and for publishing the defined user context to the context store 210.

Figure 4:
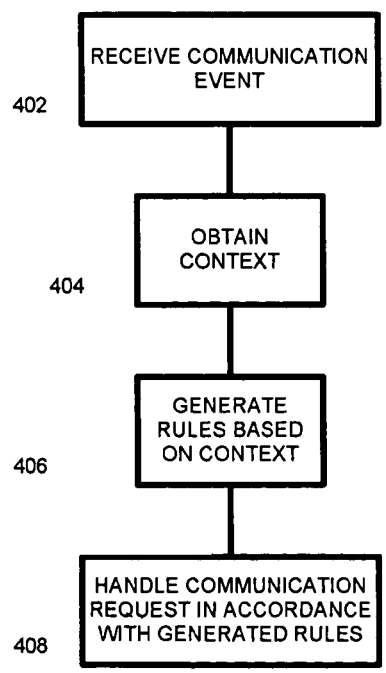
FIG. 4 is a flow diagram outlining example processing steps taken by a service or a device according to one embodiment of the present invention.

Reference is now made to FIG. 4, which shows a flow diagram outlining example processing steps taken by one of the services 206 or 208, or by one of the user devices 202 or 204, in response to a communication event being received thereby. For example, the communication event may be a call establishment request sent from a telephone handset (not shown) to the user device 202 in order to establish a telephone call. Other examples of communication events include a hang-up or off-hook signal, a dialled number, and the like.

When a communication event, such as a call establishment request intended for the telephone handset 202, is received (step 402), through an appropriate receiving element or module (not shown), by the residential telephone network 206, and prior to processing the communication event, the residential telephone network 206 obtains (steps 404), through use of an appropriate communication module (not shown), the published context of the user of the user device 202 from the context store 210. Those skilled in the art will appreciate that the user's context may be retrieved from the context store at other times, for example on a periodic or polled basis, and stored in a context cache (not shown) with the telephone network 206. The telephone network may be arranged to process both incoming and outgoing communication events in accordance with the obtained context.

Since, as previously described, the stored context contains no rules the telephone network 206 generates (step 406), using a suitable rule generator (203, 205, 207, 209) or processing logic (not shown), one or more custom rules based on the context, as described in more detail below. The rules may also be generated based on data in addition to the obtained context, such as the current time, network state, or any other appropriate data. In other embodiments the rules may be pre-generated by the telephone network 206, in which case the step 406 may consist in retrieving the pre-generated rules.

Once the custom rules have been generated based on the obtained context, the communication event is handled or processed (step 408), using appropriate processing logic (not shown), in accordance with the generated rules.

For example, if the retrieved context indicates that the user is:
At home; and
Sleeping
a rule may be generated causing the residential telephone network 206 to immediately forward all incoming calls made to the user's residential telephone subscriber number to the user's voice mail service, thereby avoiding disturbing the user. Alternatively, the generated rule may cause the user's telephone handset 202 to ring only twice before forwarding the call to the user's voice mail service. The generated rule may be implemented in a telephone network, for example, by the appropriate programming of a network switch or other network element, as appropriate, as will be apparent to those skilled in the art.

In another example, if the retrieved context indicates that the user is:
in car; and
not working
the residential telephone network 206 may generate a rule such that all incoming calls made to the user's residential telephone subscriber number are immediately forwarded to the user's mobile telephone subscriber number.

In the same manner, when a call establishment request is received by the mobile telephone network 208 the same steps 402 to 408 are performed. However, the generated rules based on the context may be different to the rules generated by the residential telephone network 206, even though the context is the same. In the present example where the retrieved context indicates that the user is:
in car; and
not working
the generated rule may cause all calls made to the mobile telephone subscriber number to be automatically forwarded to the user's mobile voice mail service. A call made to the user's work telephone subscriber may cause the generation of a rule which causes all calls made to the user's work telephone subscriber number to be immediately forwarded to his work voice mail system.

One advantage of such a system is that a user only has to publish a single context which reflects his current context, and the personalisation of one or more user services or devices is effected, without requiring the user to specify any rules along with the context, and without requiring the user to personally program or effectuate the personalisation.

Each device or service may generate its own rules based on the published context in any appropriate manner, such as using artificial intelligence or any other appropriate rule generation techniques, thereby enabling each device or service to be customised or personalised in an appropriate manner. For example, a rule generator (203, 205, 207, 209) may perform a keyword search on the published context to determine one or more rules to generate. For example, if the published context includes the text string "Sleeping" a rule generator (203, 205, 207, 209) may recognise this and generate a rule which will prevent the user from being disturbed, for example by forwarding all calls immediately to a voice mail service, by causing a user handset to use a non-auditory alert, and so on. Similarly, if the residential telephone network knows that it is the "home" telephone network and that the context indicates that the user is "at work" the rule generator (203, 205, 207, 209) may infer that the user is not at home and generate a rule that forwards all incoming calls to the users residential telephone subscriber number to the user's mobile or work telephone subscriber number. As mentioned earlier, the telephone subscriber numbers for a home, work or other location may be included in the context.

In a further embodiment each service or device alternatively, or additionally, comprises a local, or locally accessible, user profile store (213, 215, 217, 219) for storing, for example, the user's residential, work and mobile telephone subscriber numbers. The user profile (213, 215, 217, 219) may also include some user rules or preferences which may be used when generating the rules, such as "If context is 'sleeping' forward calls to voice mail", or "If context is 'sleeping' use silent alert".

In a yet further embodiment, the user context obtained from the context store is not the context of the subscriber receiving the communication event, but is the context of the subscriber initiating the event. For example, in the case of a call establishment request, the service or device receiving the call establishment request will process it based on one or more rules generated based on the context of the caller, rather than the callee.

Although the above embodiments are described in relation to a communication event, those skilled in the art will appreciate that the embodiments are not limited thereto. For example, rules may be generated to cause the customisation or personalisation of any device or service to modify the manner in which a device or service responds to or processes stimuli.

The invention claimed is:

1. A method, in a telecommunication system, of processing a communication event associated with a subscriber of a communication network comprising:
   receiving the communication event;
   obtaining context relating to the subscriber;
   with a rule generator, generating a number of rules based on the obtained context; and
   processing the communication event in accordance with the rules generated based on the obtained context;
   wherein obtaining context relating to the subscriber comprises obtaining the context of the subscriber initiating the communications event.

2. An apparatus for processing a communication event associated with a subscriber of a communication network, comprising:
   a receiver for receiving the communication event;
   a communication module for obtaining context relating to the subscriber upon receipt of the communication event;
   a rule generator for generating a number of rules based on the obtained context; and
   processing logic for processing the communication event in accordance with the generated rules;
   wherein the communication module obtains the context of the subscriber initiating the communication event.

3. A method, in a telecommunication system, of processing a communication event associated with a subscriber of a communication network comprising:
   obtaining context relating to the subscriber in response to receiving the communication event, the telecommunications system processing the communication event in accordance with a number of rules generated by a rule generator communicatively coupled to the telecommunications system based on the obtained context,
   in which the rule generator uses an artificial intelligence system to generate the rules.

4. An apparatus for processing a communication event associated with a subscriber of a communication network, comprising:
   a receiver for receiving the communication event;
   a communication module for obtaining context relating to the subscriber upon receipt of the communication event;
   a rule generator for generating a number of rules based on the obtained context: and
   processing logic for processing the communication event in accordance with the generated rules;
   wherein the rule generator uses an artificial intelligence system to generate the rules.

* * * * *